P. J. PIRUPS-HVARRE.
COMBINED MILKING AND SEPARATING MACHINE AND OPERATING MEANS THEREFOR.
APPLICATION FILED APR. 2, 1913.
1,216,726.
Patented Feb. 20, 1917.
2 SHEETS—SHEET 1.
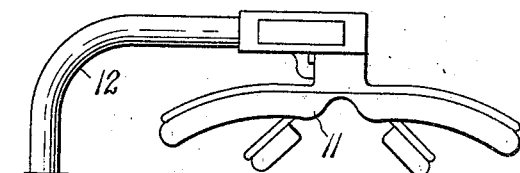
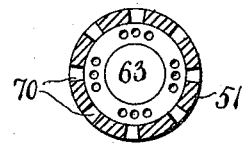
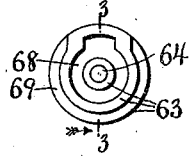
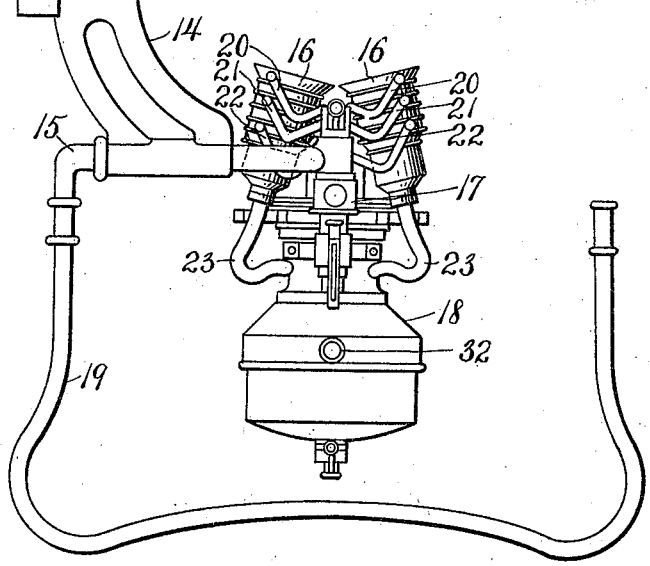
WITNESSES
W. E. Allen
Charles Lowell Howard
INVENTOR
Peder Jensen Pirups-Hvarre
By Walter Allen, Attorney

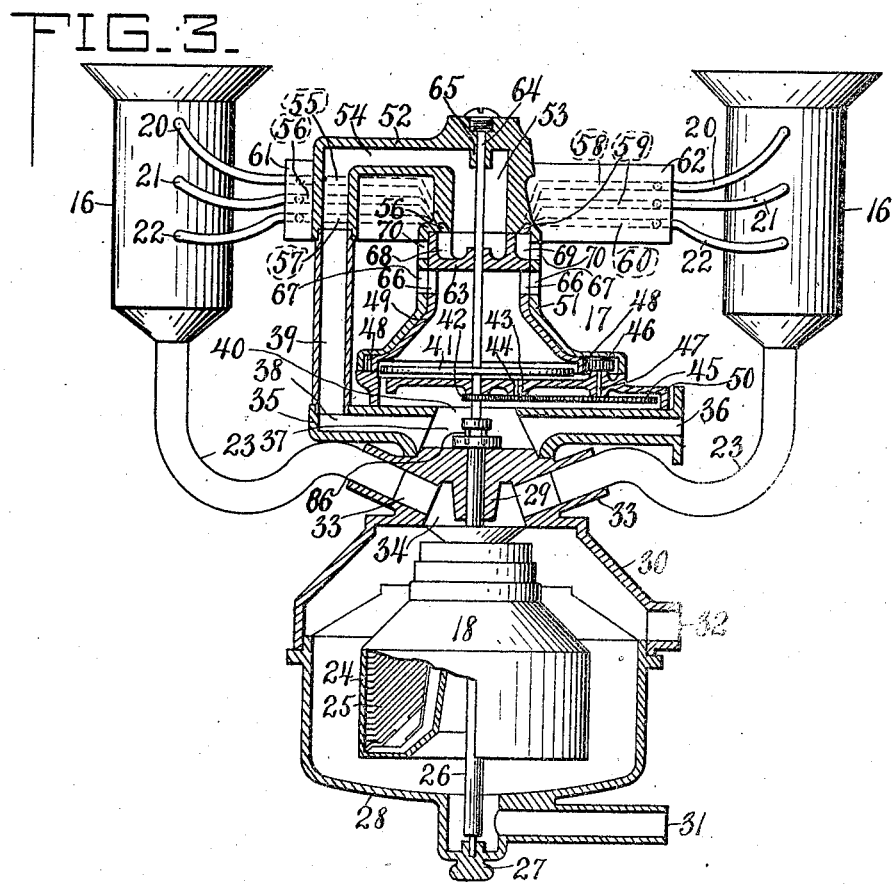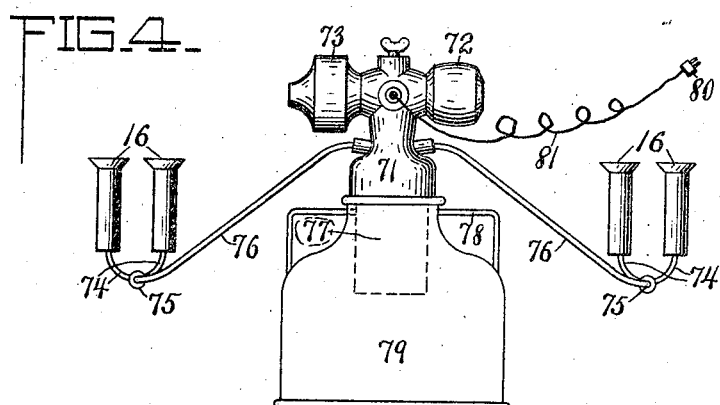

UNITED STATES PATENT OFFICE.

PEDER JENSEN PIRUPS-HVARRE, OF COPENHAGEN, DENMARK.

COMBINED MILKING AND SEPARATING MACHINE AND OPERATING MEANS THEREFOR.

1,216,726.

Specification of Letters Patent. Patented Feb. 20, 1917.

Application filed April 2, 1913. Serial No. 758,427.

*To all whom it may concern:*

Be it known that I, PEDER JENSEN PIRUPS-HVARRE, a subject of the King of Denmark, and a resident of Copenhagen, in the Kingdom of Denmark, have invented a new and useful Combined Milking and Separating Machine and Operating Means Therefor, of which the following is a description.

My invention relates to the class of milking and separating machines used in the production of milk and cream for dairy purposes, the milking machines being used for the withdrawal of milk from cows and the separating machines being used for the separation of the milk into cream and skim milk, and the object of my invention is to produce a combination of these machines by which milk may be withdrawn from the cows, separated into cream and skim milk and canned or otherwise made use of without exposure to the open air and in one continuous operation.

The advantages of machine milking have already been demonstrated as have machine separation of milk into cream and skim milk. There are additional advantages to be gained, both hygienically and technically, by the immediate separation of the milk while still in the warm and pure state in which it comes from the cows.

In order to insure these advantages the present invention contemplates a suitable milking apparatus comprising one or more sets of teat cups with the necessary mechanical actuating means operated by electric, hydraulic or pneumatic power combined with a centrifugal separator in such a manner that the several teat cups, together with their connecting milk tubes, serve as the hopper or as hopper feeders to the centrifugal drum in which the separation takes place, the whole mechanism being combined in one portable device adapted for personal application to the cow with the aid of suitable supporting frame, bracket or belts.

The teat cups may be of any suitable type that is operated by compressed air or other fluid and which delivers the milk to piping and the centrifugal separator may be of any type of a convenient size embodying a rotating bowl and liner within a suitable casing provided with milk inlet or inlets and with cream and skim milk outlets, my invention having principally to do with the means which, being supplied with compressed air or other fluid from a suitable pump, causes the teat cups and separator to work in harmony.

In the accompanying drawings—

Figure 1 illustrates one form of my invention embodied in an outfit comprising teat cups, controlling means, separator, air supply pipe and supporting bracket for use with one cow.

Figs. 2 and 2ª are details of a pulsator casing and valve.

Fig. 3 is an enlarged vertical section through the operating means and separator.

Fig. 4 is a modification, in which an electric operating means and separator is used, feeding directly into cream and skim milk cans, the construction being applicable to two cows as illustrated.

11 is a cushioned yoke adapted to rest upon the back of a cow and supporting, through bent arm 12, downward extensions 13, attaching bracket 14, and air supply pipe fitting 15, the teat cups 16, operating means 17, and separator 18. Compressed air or other fluid is supplied to the operating means 17, through pipe fitting 15, by piping 19, from a suitable pump not shown.

The teat cups 16 are preferably of a form illustrated and claimed in a copending application filed of even date herewith, each teat cup being operated by compressed air through three or more small flexible pipes 20, 21 and 22, and delivering milk through pipe 23.

The centrifugal separator comprises the usual rotating bowls 24 and 25, mounted on a shaft 26 having its ends bearing respectively in foot-bearing 27, in the bottom part 28 of a two-part casing, and in a steady bearing 29 in the top part 30 of a two-part casing. The bottom part 28 is provided with a skim milk outlet 31 and the top part 30 is provided with a cream outlet 32 and a number of milk inlets 33 feeding to an axial chamber 34 above the separator bowls, the bottom part 28 being removably secured to the top part 30.

On top of the top part 30 of the casing is mounted and removably secured the operating means comprising a disk-shaped member 35 having an air inlet 36 leading to an axial chamber 37, an air outlet 38 leading to an upwardly extending passage in a tube 39, and an axial outlet 40 leading to the driving gear or air motor; an air motor comprising a turbine wheel 41, gear wheel 42, intermediate gear wheel 43 mounted on a stub shaft 44, large gear wheel 45 and small gear wheel 46 both mounted on short shaft 47 and serving to rotate through a peripheral rack 48 a bell-shaped inner shell 49; a second disk-shaped member 50 resting on the disk-shaped member 35 and in which the air motor is mounted; an outer shell 51 inclosing the inner shell 49; a top member or hood 52 integral with outer shell 51 and fitting on tube 39, and containing an axial chamber 53 connecting through horizontal air inlet passage 54 with the passage in the tube 39 in one direction and with air outlet holes 55, 56, 57, and 58, 59, 60, extending through the wings 61 and 62 respectively, the entrances to the air outlet holes being controlled by the rotating valve or pulsator 63 formed in the top of the shell 49 beneath the axial chamber 53, in the other direction; the turbine wheel 41 being secured on a vertical shaft 64 having its upper end in an adjustable bearing 65 in the top of the hood 52, the shaft passing through the valve, or pulsator 63, the disk-shaped member 50, and the gear wheel 42, secured to shaft 64 which is provided with a clutch connection 86 for driving the shaft 26.

The inner shell 49 has a series of air outlet ports 66 allowing the air which passes through and operates the turbine wheel 41 to escape through ports 67 in the outer shell 51, and the valve or pulsator 63 formed in the top of the inner shell 49 has an inner cavity or circular port as it were 68 communicating with the air outlet holes 55, 56, 57, 58, 59, and 60 and is further provided with an outer recess 69 allowing the air outlet holes 55, 56, 57, 58, 59, and 60 in the hood 52 to communicate with the exhaust ports 70 in the outer shell. The ports are arranged in groups and series according to the pulsation desired in the teat cups. The arrangement for a four teat cup operation being shown in Figs. 2 and 2ª.

In the operation of the device the compressed air from the pump enters through inlet 36 to the axial chamber 37 where the current divides, one part of the air passing upward through the outlet 40 to the turbine wheel 41 and out through the ports 66 and 67 to the atmosphere, the other part of the air passing through outlet 38, tube 39, horizontal passage 54, and to chamber 53, where the air is further divided, the several currents passing out or pulsating through the various holes 55, 56, 57, 58, 59, and 60, to the pipes 20, 21 and 22, the pressure after each pulsation being relieved by the back movement of the air exhausting through the said recess 69 and the exhaust ports 70 of the outer shell as the valve or pulsator rotates.

In Fig. 4 I have shown an embodiment of the invention in which the motor is designed to be operated by an electric current, the construction illustrated being applicable to two cows, although by suitable connection a more or less number may be operated on. The separator 71 is driven by suitable gearing from the motor 72, and the pressure for the teat cups is furnished by a pump 73 on the same shaft as the motor. The milk is received by the separator 71 from the teat cups 16 through pipes 74, connections 75 and piping 76, the cream being discharged from the separator 71 directly into the small receptacle 77, and the skim milk being discharged through pipes 78 into the larger receptacle 79. The electric supply may come from any suitable source through the connection 80 and conductor 81.

Having thus described my invention the following is what I claim as new therein and desire to secure by Letters Patent:

1. The combination, with a milking machine; of a separating machine and means whereby the milking machine and separating machine may be suspended from the body of the animal operated on.

2. Means for suspending a milking machine and separating machine from the body of an animal comprising a yoke adapted to rest upon the back of the animal, a bent arm extending from the yoke and having a downward extension, an attaching bracket secured to the extension and an air supply pipe-fitting supported in the bracket and from which a milking machine may be suspended.

3. Means for simultaneously operating a milking machine and a separating machine comprising a shaft, a gear wheel mounted on said shaft, a milking machine pulsator valve mounted to rotate on said shaft, driving means between said gear wheel and said pulsator valve, a centrifugal separator mounted on said shaft, and means for rotating the shaft.

4. Means for simultaneously operating a milking machine and a separating machine comprising a shaft, a gear wheel mounted on said shaft, a milking machine pulsator valve mounted to rotate on said shaft, reducing gearing between the gear wheel and the milking machine pulsator valve, an inclosing shell for the gear wheel, reducing gearing and pulsator valve, and means for rotating the shaft.

5. Means for simultaneously operating a milking machine and a separating machine comprising a shaft, a gear wheel mounted on said shaft, an inner rotatable shell, reducing gearing between the gear wheel and said inner shell, a milking machine pulsator valve mounted to rotate on said shaft and supporting the inner shell, an outer shell for inclosing said inner shell and pulsator valve and means for rotating the shaft.

6. Means for simultaneously operating a milking machine and a separating machine comprising a turbine driven shaft, a separable connection between the turbine driven shaft and the separating machine shaft, a milking machine pulsator valve mounted on the turbine driven shaft and carrying an inner shell, reducing gearing between the turbine driven shaft and the inner shell, an outer shell for inclosing said pulsator valve and inner shell, air exhaust ports in the shells, and air inlet and outlet ports controlled by the pulsator valve.

PEDER JENSEN PIRUPS-HVARRE.

Witnesses:
 EDWARD LEONARD,
 W. O. BISHOP.